United States Patent

Donoghue

[11] Patent Number: 5,832,800
[45] Date of Patent: Nov. 10, 1998

[54] CLUB SANDWICH CUTTER

[76] Inventor: Terence Donoghue, 67 W. Central Ave., Pearl River, N.Y. 10965

[21] Appl. No.: 839,648

[22] Filed: Apr. 15, 1997

[51] Int. Cl.⁶ ...................................................... B26D 7/02
[52] U.S. Cl. .......................... 83/467.1; 83/468.7; 83/762; 83/932
[58] Field of Search ............................... 30/114; 83/932, 83/762, 467.1, 467.2, 468.7

[56] References Cited

U.S. PATENT DOCUMENTS

| | | | |
|---|---|---|---|
| 230,294 | 7/1880 | Lincoln | 30/114 |
| 850,022 | 4/1907 | Lewis | 30/114 |
| 1,252,189 | 1/1918 | Smith | 30/114 |
| 1,453,367 | 5/1923 | Schipplock et al. | 30/114 |
| 1,457,233 | 5/1923 | Slovack | 30/114 |
| 1,603,941 | 10/1926 | Edwards | 30/114 |
| 2,003,253 | 5/1935 | Deutsch | 30/114 |
| 2,302,323 | 11/1942 | Hubbard | 30/114 |
| 2,707,504 | 5/1955 | Hill | 30/114 |
| 2,713,880 | 7/1955 | Hill et al. | 30/114 |
| 2,716,950 | 9/1955 | Johnston | 30/114 |
| 3,016,608 | 1/1962 | Myers | 30/114 |
| 3,027,639 | 4/1962 | Lovell | 30/114 |
| 3,045,347 | 7/1962 | Elias et al. | 30/303 |
| 3,060,838 | 10/1962 | Priore | 30/114 |
| 3,132,423 | 5/1964 | DeLano | 30/114 |
| 4,250,618 | 2/1981 | Custer et al. | 30/114 |

Primary Examiner—Maurina T. Rachuba
Attorney, Agent, or Firm—Terrance L. Siemens

[57] ABSTRACT

A cutter for manually cutting club sandwiches into four wedge or triangular sections. The cutter has a flat base and a cutting blade assembly mounted to the base. The cutting blade assembly comprises four blades arranged in cruciform pattern, a handle, and a shaft connecting the blades to the handle. A cover guard preventing direct contact with the blades from above is slidably mounted on the shaft, and urged into proximity with the blades by a spring. The cover guard has holes enabling decorative toothpicks to be inserted into the center of each section of a cut sandwich. A guide constrains the cutting blade assembly to move only vertically and reciprocatably relative to the base, and prevents rotation about the longitudinal axis of the shaft. A resilient member holds the cutting blade assembly in an elevated "ready" position above the base. Stops are selectively mounted on the base to enable centering sandwiches made from different standard bread loaf dimensions on the base.

4 Claims, 3 Drawing Sheets

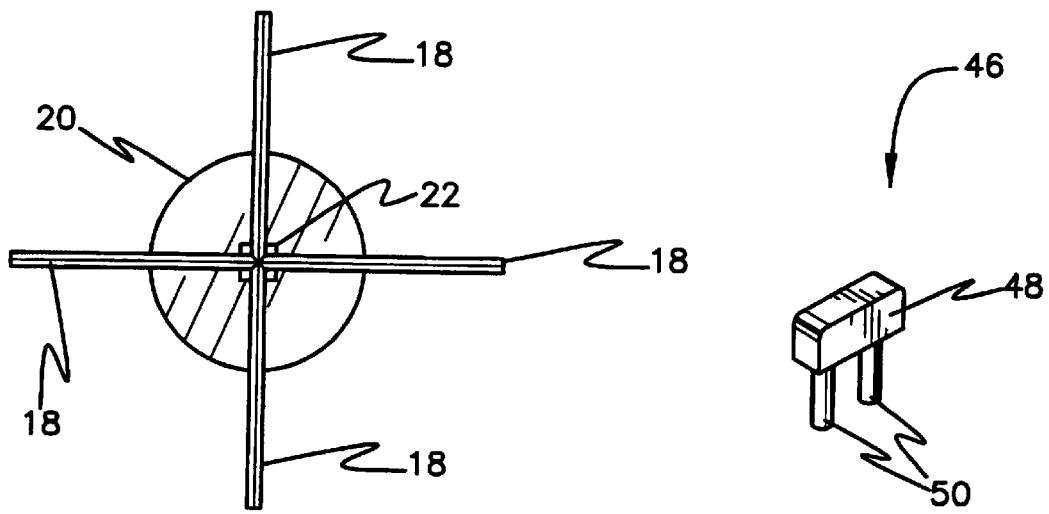
FIG. 2
FIG. 4
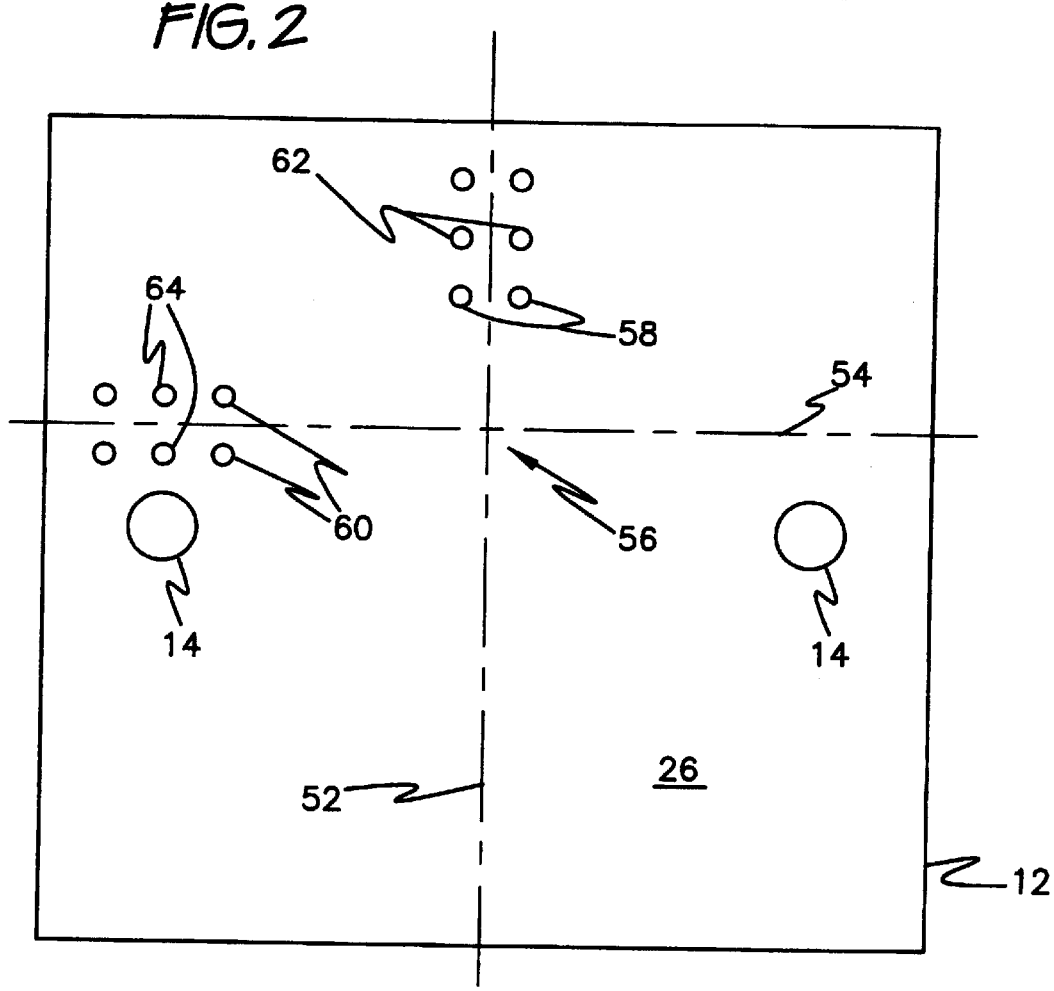
FIG. 5

CLUB SANDWICH CUTTER

BACKGROUND OF THE INVENTION

1. Field of The Invention

The present invention relates to a cutting device for cutting comestibles. More particularly, the invention comprises a device for cutting sandwiches into plural sections. The device comprises a vertically reciprocatable blade assembly mounted on a base and driven downwardly into the comestible being cut manually by a driving handle. The blade assembly is cruciform, for dividing an item into quadrants, and is shielded by a guard cover.

2. Description of The Prior Art

Commercial food preparing establishments are plagued by the nature of their business in that scheduling frequently demands that foods be prepared en masse within a limited window of time. This is because most foods cannot be prepared well in advance of consumption. Therefore, the preparer must perform certain tasks very quickly, thereby processing many portions in a short time period.

This situation bedevils catering establishments and others which make it their business to offer club sandwiches. Contemporary tradition demands that club sandwiches be cut into equal quadrants prior to serving the clientele. If a large number of club sandwiches must be cut in this manner, a considerable time must be devoted to this step of preparation.

The prior art has suggested devices which are designed to cut a single item into plural sections. Most such devices are devoted to cutting dessert pies, cakes, and pizza pies into generally triangular wedge shaped sections. Use of such devices affords advantages other than conserving time of preparation. One advantage is that portion sizes and slice dimensions are standardized, so that unfavorable sentiment of customers who may compare portions will not be aroused. Another is that certain items are difficult to handle by hand. Pizza pies fresh from an oven are susceptible to fluent hot cheese sticking to knives or other cutting devices. Cakes and dessert pies may be delicate and subject to deformation if cut by hand.

Base mounted cutters having spring return of the blade assembly into an elevated, "ready" position are shown in U.S. Pat. Nos. 1,453,367, issued on May 1, 1923 to Charles J. Schipplock et al. and 3,132,423, issued to Artus D. DeLano on May 12, 1964. DeLano shows positioning pins for centering a pizza pie beneath the cutter, although his positioning mechanism is different from that of the present invention. These inventions lack a guard extending fully over and around cutting blades and guide holes for inserting toothpicks through each cut slice, and blades arranged in cruciform fashion to cut four slices having perpendicularly cut surfaces, as found in the present invention.

U.S. Pat. Nos. 1,457, issued to Joseph J. Slovack on May 29, 1923, and 4,250,618, issued to Michael D. Custer et al. on Feb. 17, 1981, illustrate cutters having radiating blades and spring urged retraction of the blade assembly. Slovack and Custer et al. lack the base, vertical cutter guides, food positioning mechanism, blade guard, toothpick guides, and cruciform blade pattern of the present invention.

None of the above inventions and patents, taken either singly or in combination, is seen to describe the instant invention as claimed.

SUMMARY OF THE INVENTION

The present invention provides a cutter which is capable of cutting pies, cakes, and the like into slices, but which is particularly suited to cutting club sandwiches into four wedge shaped slices. Unlike cakes and pizza and dessert pies, which are typically cut into five to eight slices, it is customary to cut club sandwiches into four equal slices. Therefore, the novel cutter has four blades arranged in cruciform fashion.

The cutter has a base for supporting the cutter on a horizontal environmental surface and for supporting and positioning a sandwich placed on the cutter for cutting. The blade assembly is mounted on two vertically oriented guide rods, and is supported in elevated "ready" position by a resilient member. The blade assembly is covered by a cover guard entirely covering the blades and preventing contact with the blades from above. The guard has holes formed therein at appropriate locations for inserting decorative toothpicks therein. The guard thus serves as a template assuring that a toothpick driven vertically into the sandwich will be substantially centered within each cut slice of the sandwich.

The guard is not fixed to the blade assembly, but rather may slide along the shaft connecting a handle to the blades. Sliding is yieldably opposed by a spring. A resilient locking detent device maintains the blade assembly in an elevated "ready" position after it is manually lifted from the bottom of its stroke. The detent device is fixed to the blade assembly, and engages one of the two guide rods.

The novel cutter also has a food positioning apparatus especially suited for positioning sandwiches made from square cut slices of bread. The positioning apparatus comprises two stops each having a flat face contacting the bread of the sandwich. The stops are adjustable in that plural holes for anchoring the stops within the base are provided.

Accordingly, it is a principal object of the invention to provide a cutter suited for cutting club sandwiches into four equal sections.

It is another object of the invention that the cutter have positioning apparatus for positioning square cut bread slices such that the slices will be cut into four equal sections.

It is a further object of the invention that the cutter exhibit a cruciform cutting pattern.

Still another object of the invention is to provide a cover preventing hand contact with the blades from above.

An additional object of the invention is to provide a template for locating decorative toothpicks at the center of each of the four cut sections of the sandwich.

It is again an object of the invention to carry the cover guard on the blade assembly.

Yet another object of the invention is that the cover not be solidly fixed to the blade assembly.

Still another object of the invention is to provide a detent for holding the blade assembly in the elevated "ready" position.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a bottom plan detail view of a component shown at the top of FIG. 1, with a spring omitted for clarity.

FIG. 4 is a perspective detail view of a component shown towards the bottom center of FIG. 1.

FIG. 5 is a top plan view of the base of the invention, shown at the bottom of FIG. 1.

DETAILED DESCRIPTION OF THE PREFERRED EMBODIMENTS

Figure 1:
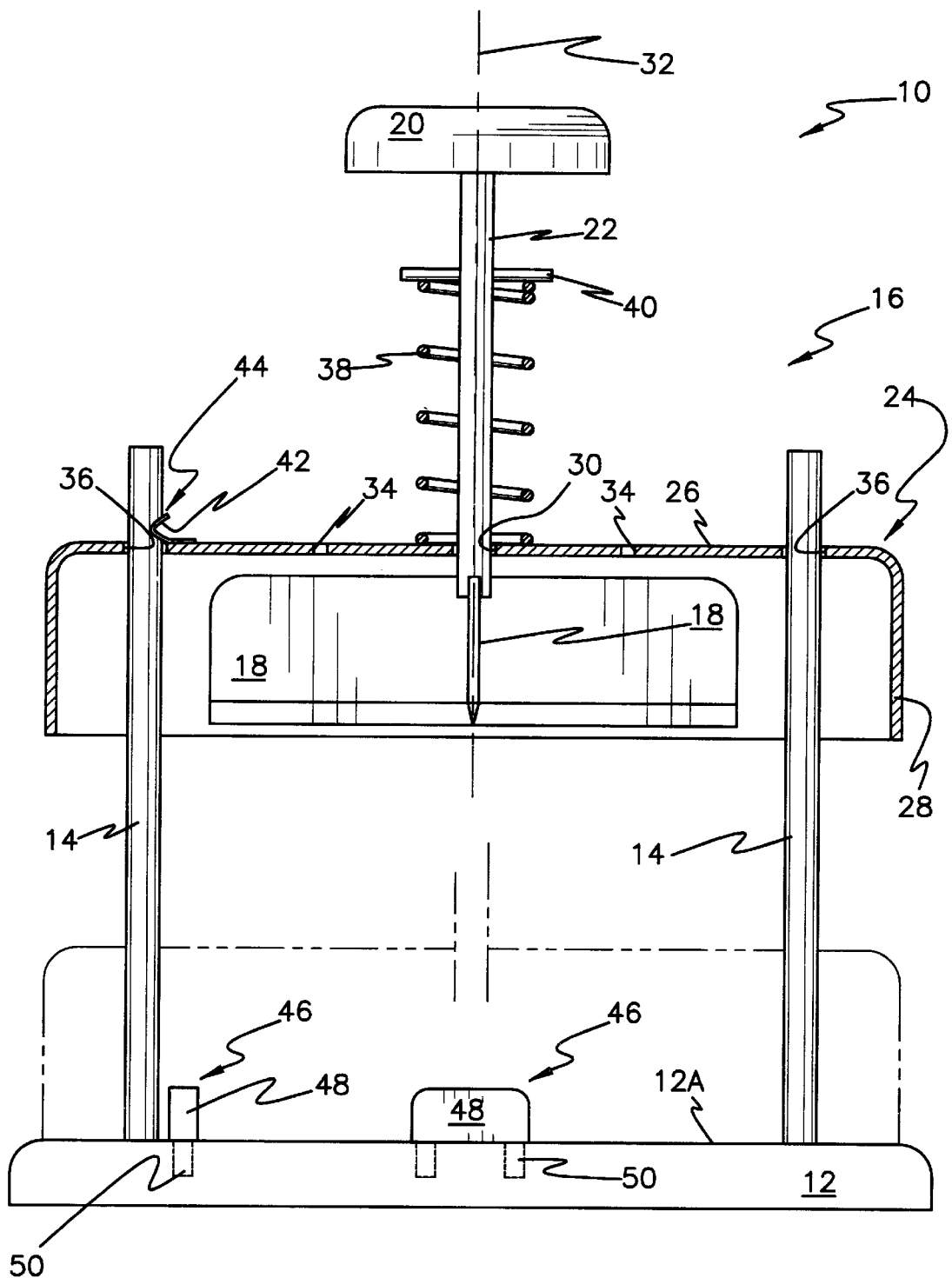
FIG. 1 is a side elevational view of the invention, shown partially in cross section.

Turning now to FIG. 1 of the drawings, cutter 10 is seen to comprise a flat base 12 to which are mounted two guide rods 14. Base 12 supports cutter 10 on a horizontal environmental surface (not shown), and has an upper surface 12A on which comestible materials (not shown) are placed for cutting.

A cutting assembly 16 is reciprocatably supported on base 12, reciprocatably moving between an elevated "ready" position indicated in solid lines and a fully lowered position, indicated in broken lines, which represents the bottom of a cutting stroke. Cutting assembly 16 comprises a plurality of individual cutting blades 18, a handle 20 for enabling manual depression of cutting blade assembly 16 from the "ready" position, and a shaft 22 connecting handle 20 to cutting blades 18. Cutting blades 18 are mounted to shaft 22 in any suitable way, and may include additional members (not shown) for effecting and reinforcing connection to shaft 22.

Shaft 22 is square in cross section, this being shown in FIG. 2. FIG. 2 further reveals that cutting blades 18 are arranged on cutting blade assembly 16 in a cruciform blade pattern. The actual number of blades 18 is unimportant, so long as their cutting edges collectively assume form the cruciform configuration depicted in FIG. 2.

Cutting blade assembly 16 further comprises a cover guard 24 which is sufficiently extensive to cover cutting blades 18 from above and from the side such that the user's hands and fingers (not shown) may not contact cutting blades 18 from above and from the side. Cover guard 24 comprises a top wall 26 and a depending lateral wall 28 to assure this degree of coverage of blades 18.

Top wall 28 of cover guard 24 is penetrated by a central opening 30, for passing shaft 22 therethrough. Opening 30 is square in configuration and just larger than the diameter of shaft 22. The square configuration of shaft 22 and opening 30 provide a keying relationship constraining shaft 22 from rotating about its longitudinal axis 32. However, cover guard 24 is simultaneously carried with cutting blade assembly 16 such that cover guard 24 can move vertically relative to cutting blades 18 within predetermined limits. This relationship enables cutting blades 18 to continue to move downwardly after cover guard 24 contacts base 12. This feature assures that cover guard 24 need not be precisely located vertically with respect to blades 18, thereby minimizing precision and cost of manufacture.

Figure 3:
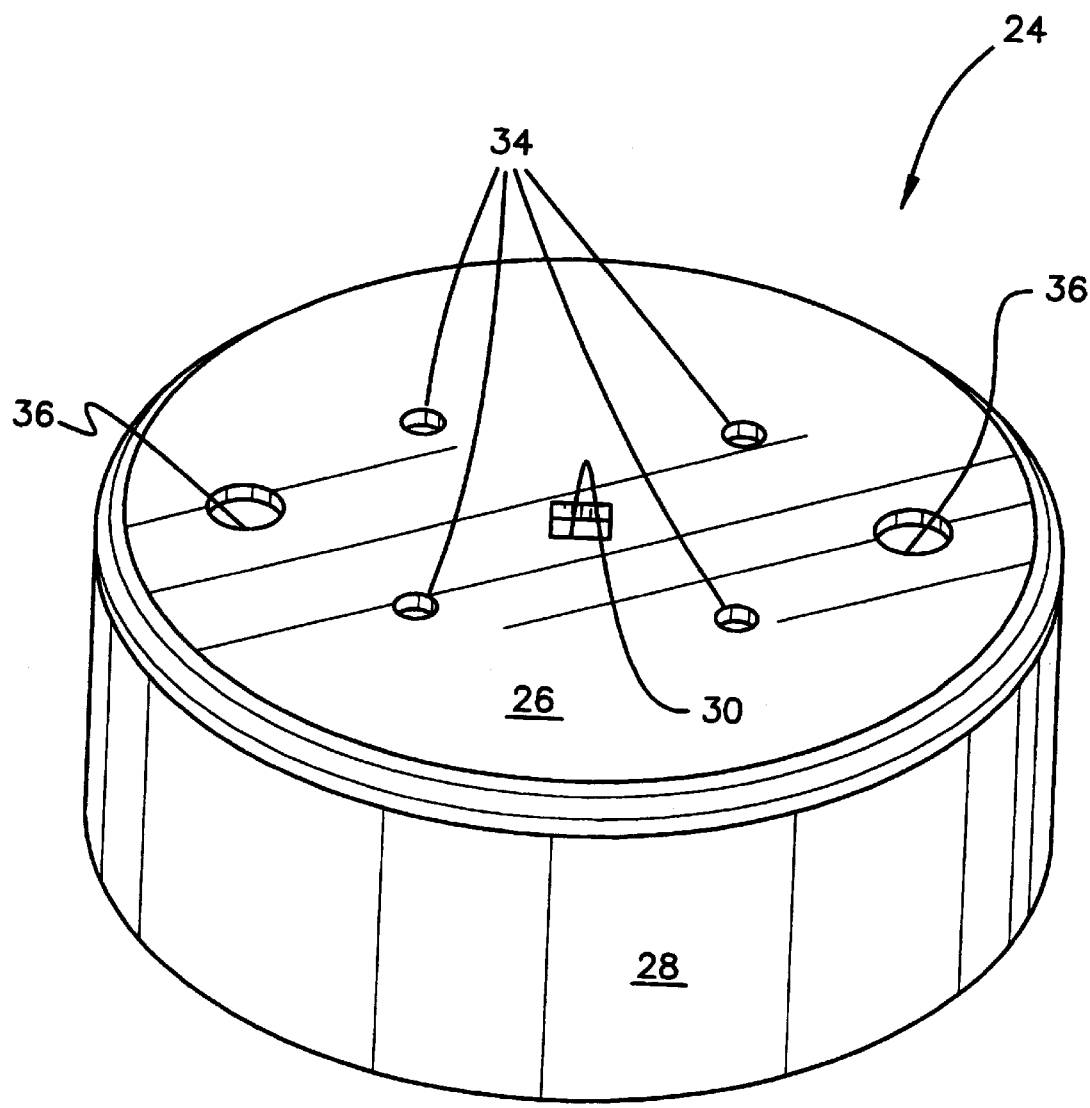
FIG. 3 is a perspective detail view of a component shown at the center of FIG. 1.

FIG. 3 provides another view of cover guard 24, wherein opening 30, four small holes 34, and two holes 36 are clearly visible. Holes 34 are formed in top wall 26 so that cover guard 24 may serve as a template for inserting decorative toothpicks (not shown) into the comestible material (not shown) at locations centered with respect to each cut section of the comestible material after cutting.

Holes 36 allow guide rods 14 to pass through cover guard 24. Because there are two guide rods 14, cover guard 24 is keyed to base 12. Recalling that shaft 22 is keyed to cover guard 24, it follows that blades 18 are constrained against rotating about axis 32, which axis 32 is perpendicular to upper surface 12A of base 12. Therefore, characteristics of cover guard 24 taken in combination with guide rods 14 provide a guide for constraining cutting blade assembly 16 to reciprocate vertically relative to base 12.

The guiding function extends further to constraining blades 18 against rotating relative to comestible material placed on base 12. This feature is irrelevant in cutting round objects, such as cakes and pies (neither shown), but critical in cutting sandwiches (not shown) made from parallelepipeds, such as square cut loaves of bread.

When undesired rotation of blades 18 is prevented, vertical cuts may be made in objects other than circular at vertices and at selected points on external edges of polygonally and irregularly configured comestible materials being cut. Normally, cuts formed in club sandwiches will pass through vertices of the square cut slabs of bread. Cutter 10 is thus suited for cutting comestible material into wedge shaped sections, as is customarily demanded when preparing club sandwiches. However, the user may adjust the comestible material on base 12 to achieve other orientations of the incisions.

Cover guard 24 is urged downwardly, in close proximity to blades 18, by a coil spring 38 entrapped between blades 18 and a spring keeper 40. If desired, handle 20 may serve in place of spring keeper 40. Cover guard is further held in a predetermined elevated position above base by detent apparatus. This apparatus includes a resilient tongue 42 which is fixed to cover guard 24. Tongue 42 resiliently and releasably engages a notch 44 formed in a guide rod 14. Of course, mounting of the detent apparatus may be reversed in that tongue 42 may be mounted on a guide rod 14, with notch 44 being formed in cutting blade assembly 16.

Unlike pies and cakes, which are radially symmetrical, it is required that sandwiches made from square bread loaves be properly oriented with respect to blades 18. This requirement is met by a plurality of stops 46, which are designed to position slabs of comestible material (not shown) on base 12 at a predetermined orientation with respect to cutting blade assembly 16. Each stop 46 has a flat face 48 arranged to contact an edge of a rectangular slab of comestible material, and two pegs 50 for engaging base 12 for anchorage. Stops 46 are shown isolated from base 12 in FIG. 4.

Although a single elongated stop (not shown) may be adequate in adjusting a slice of bread to be square relative to blades 18, it is preferred that at least two stops 46 be provided with their points of anchorage arranged along two intersecting orthogonal axes 52, 54. A preferred layout of holes for receiving pegs 50, thereby providing anchorage for stops 46, is shown in FIG. 5.

Anchorage holes are arranged in pairs serially on surface 26 of base 12 along axes 52, 54, each pair of holes defining one anchorage point. For each anchorage point located on axis 52, there is a corresponding anchorage point located on axis 54. For example, holes 58 provide one anchorage point corresponding to that provided by holes 60. Intersection 56 is equidistant from holes 58 and corresponding holes 60. Similarly, intersection 56 is equidistant from holes 62 and corresponding holes 64.

The present invention is subject to modifications and variations which may be introduced by those of skill in the art. Several examples will be presented. Pairs of holes 58, 60, 62, and 64 may be eliminated in favor of single non-circular holes, if desired. Keying of stops 64 in appropriate orientation to blades 18 is thus assured, while eliminating requirements for plural pegs 50 for each stop 46.

Similarly, number and configuration of guide rods 14 may be modified, although it is preferred that plural guide rods 14 be provided to avoid binding of cover guard 24 due to asymmetrical forces. The precise cross sectional configuration of shaft 22 may be varied. Spacing and number of anchorage points may be varied to suit.

It is to be understood that the present invention is not limited to the embodiments described above, but encompasses any and all embodiments within the scope of the following claims.

I claim:

1. A sandwich cutter for cutting a sandwich into wedge-shaped sections, comprising:

a generally rectangular base for supporting said cutter on a generally horizontal surface, said base having an upper surface for supporting the sandwich;

a reciprocating cutting blade assembly supported on said base, said blade assembly including a plurality of vertically oriented cutting blades, a handle for enabling manual depression of said cutting blade assembly toward said upper surface of said base, and a shaft connecting said handle to said vertically oriented cutting blades;

a guide for holding said vertically oriented cutting blades perpendicular to said upper surface of said base; and a pair of stops located on said upper surface of said base, each of said stops including a generally flat upright face, each said upright face being disposed parallel to an edge of said generally rectangular base, where said associated edges are adjacent one another, and where said upright faces are adapted to engage the side of a sandwich, where each of said stops also includes adjustment means comprising a pair of depending pegs that cooperate with a plurality of anchorage holes in said base to allow changes in the distance between each said stop and its associated said edge of said base; whereby a sandwich is placed onto said upper surface of said base, and urged into contact with both said flat upright faces of said stops, said reciprocating cutting blade assembly is manually depressed towards said upper surface of said base and said vertically oriented cutting blades cut the sandwich into a predetermined shape.

2. The sandwich cutter according to claim 1, further including a cover guard on said reciprocating cutting blade assembly, said cover guard covering said vertically oriented cutting blades from above and from the sides.

3. The sandwich cutter according to claim 1, further including a template having small apertures adapted to receive a decorative toothpick such that the toothpicks may be inserted into predetermined locations in the sandwich.

4. The sandwich cutter according to claim 1, wherein said vertically oriented cutting blades are arranged in a cruciform pattern.

* * * * *